United States Patent [19]

Katoh et al.

[11] Patent Number: 5,059,447
[45] Date of Patent: Oct. 22, 1991

[54] METHOD FOR THE ACITIVATION OF A SURFACE OF A SHAPED BODY FORMED OF A SYNTHETIC ORGANIC POLYMER

[75] Inventors: Koichiroh Katoh, Abilo; Etsuji Takehara, Tokyo; Yoshiie Matsumoto, Iruma, all of Japan

[73] Assignee: Director-General of Agency of Industrial Science and Technology, Japan

[21] Appl. No.: 479,683

[22] Filed: Feb. 15, 1990

[51] Int. Cl.$^5$ ............................................. B05D 3/06
[52] U.S. Cl. .................................. 427/37; 427/39; 427/54.1; 427/307; 427/316; 427/322; 427/430.1; 427/444
[58] Field of Search .................. 427/37, 39, 307, 54.1, 427/316, 322, 430.1, 444

[56] References Cited

U.S. PATENT DOCUMENTS

| | | | |
|---|---|---|---|
| 4,465,715 | 8/1984 | Manabe et al. | 427/38 |
| 4,724,057 | 2/1988 | Ebisana | 427/40 |
| 4,820,580 | 4/1989 | Hocker et al. | 427/243 |
| 4,824,699 | 4/1989 | Woo et al. | 427/35 |
| 4,840,851 | 6/1989 | Golandes | 427/40 |

*Primary Examiner*—Bernard Pianalto
*Attorney, Agent, or Firm*—Lorusso & Loud

[57] ABSTRACT

A shaped body formed of a synthetic organic polymer is surface-treated for increasing the surface energy by a spark discharge treatment which is preceded and/or followed by a treatment with a UV ray-absorbing organic liquid and/or a UV irradiation treatment.

11 Claims, 1 Drawing Sheet

METHOD FOR THE ACTIVATION OF A SURFACE OF A SHAPED BODY FORMED OF A SYNTHETIC ORGANIC POLYMER

BACKGROUND OF THE INVENTION

1. Field of the Invention

This invention relates to a method for the treatment of a surface of a shaped body formed of a synthetic organic polymer for the activation of the surface.

2. The Prior Art

Since synthetic organic polymers, such as polyolefins which consist only of saturated hydrocarbons and which are hydrophobic and highly crystalline in nature, generally has a low surface energy, the surfaces of shaped bodies such as sheets and fibers of such polymers are hard to be coated, printed, bonded or dyed. Therefore, it is necessary to pretreat such shaped bodies and to increase the surface energy thereof prior to coating, printing, bonding, dyeing or the like surface processing.

A variety of surface pretreating techniques have been hitherto proposed. For example, as pretreating methods for coating, printing and bonding, there are known a sand blast treatment, a treatment with vapor of a solvent, a treatment with a chromic acid mixture, a flame treatment, a corona discharge treatment, a plasma treatment, a functional groups-introducing treatment, a UV irradiation treatment, a treatment with phosphoric acid or naphthalenesulfonic acid, a satinizing treatment and a photo-grafting treatment. These conventional methods, however, are not entirely satisfactory for the reasons as set forth below.

The sand blast treatment method is one in which granules of a grinding material are caused to impinge on a surface of a shaped body to be treated for roughing same. The granular grinding material causes fouling of the working environment and the product. The surface of the treated product is, therefore, required to be washed with water. Further, there are caused problems that the treatment makes the surface opaque and that the grinding material once cut into the surface cannot be removed.

The solvent vapor treatment includes exposing, for a short period of time, a shaped body to vapors of a superheated, halogenated hydrocarbon so that an amorphous portion of the surface of the shaped body is etched and swollen. It is, however, necessary to provide over the treated surface a primer layer containing chlorinated propylene prior to coating. In addition, unless the primer coat is provided immediately after the treatment, the treatment soon becomes ineffective. The treatment sometimes causes distortion of the shaped body. The treated surface should be heated for the removal of the solvent remaining after the coating. Additionally, this method is dangerous because of the necessity to handle vapors of a halogenated hydrocarbon which also tends to cause deterioration of the apparatus.

The treatment with chromic acid mixture includes heating the mixture (containing 75 parts of potassium bichromate, 120 parts of water and 1500 parts of concentrated sulfuric acid) to about 100° C., and immersing a shaped body to be treated in the heated mixture for about 5 min. This method requires high costs for the treatment of the waste chromic acid mixture.

The flame treatment includes exposing the surface of a shaped body to be treated to an oxidizing flame (1000-2500° C.) produced by the combustion of a gas containing an excess air. The surface is liable to be distorted or melted by the heat.

The corona discharge treatment includes passing a film or film-like body to be treated through a space between an electrode and a metal roller while applying a high electric voltage therebetween. This method is not applicable to other shaped bodies than those of a film-like form.

The plasma treatment includes exposing the surface of a plastic body to a low temperature plasma so that the surface undergoes a chemical change by the action of dissociated oxygen and ultraviolet rays. Plasma of oxygen or air is used. This method is disadvantageous because of the necessity of an expensive apparatus.

The functional groups-introducing method includes irradiating UV rays on the surface of a shaped body in an atmosphere of chlorine, and then treating the irradiated surface with an alkali. This method poses a problem of handling very dangerous chlorine gas.

The photo-grafting method includes admixing benzophenone with polypropylene powder, forming the admixture into a film, and photo-treating the surface of the film in the presence of acrylamide in an oxygen-free atmosphere for photochemically graft-copolymerizing the acrylamide with the polypropylene. This method requires complicated steps and is economically disadvantageous.

The UV irradiation treatment has a problem because the treatment requires a relatively long period of time in order to obtain desired results. Further, it is difficult to uniformly treat a surface of a shaped body to be treated.

The satinizing treatment includes immersing a polyacetal shaped body to be treated in a liquid bath containing p-toluenesulfonic acid, perchloroethylene-containing diatomaceous earth and dioxane at 80-120° C. for 10-30 seconds. The treated body is then allowed to stand in air at 38-120° C. for about 1 minute for drying and thereafter washed with water and dried. During this treatment perchloroethylene is vaporized to cause problems of bad odor and of variation of the composition of the bath.

The treatment with phosphoric acid or naphthalenesulfonic acid is effective only to specific polymers.

U.S. Pat. No. 4,853,253 issued to Katoh discloses a method in which a polymeric shaped body is first contacted with a UV-absorbing solvent at an elevated temperature and then the treated body is irradiated by UV rays with a wavelength of 1800-2100 Å. While this method is effective to the activation of a flat surface, a shaped body with concaved portions into which a UV lamp is not able to be inserted cannot be activated satisfactorily.

SUMMARY OF THE INVENTION

The present invention is aimed at the provision of a method of treating an inactive surface of an organic polymeric shaped body which is devoid of the defects of the conventional methods.

In accordance with the present invention, there is provided a method of treating a surface of a shaped body formed of a synthetic organic polymer, wherein said surface is subjected to (a) a spark discharge treatment for increasing the surface energy of said surface, characterized in that at least one treatment selected from (b) a solvent treatment in which said surface is contacted with a UV ray-absorbing organic liquid at a temperature and for a period of time sufficient to swell said surface and (c) a UV treatment in which said surface is irradiated by UV rays having wave lengths in the range of 1800–2100 Å is performed before and/or after step (a), with treatment (b) being followed by treatment (a) or (c).

BRIEF DESCRIPTION OF THE DRAWINGS

The present invention will now be described in detail below. In the accompanying drawings.

DESCRIPTION OF THE PREFERRED EMBODIMENTS

Figure 1:
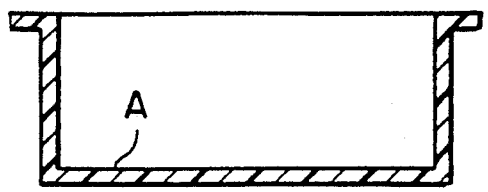
FIGS. 1–3 are elevational cross-sectional views showing shaped bodies used in the hereinafter described Examples and Comparative Examples.

The term "synthetic organic polymer" used in the present specification is intended to refer to a synthetic resin having low surface energy. Examples of such synthetic resins include polyolefins, acetals and other synthetic organic polymers having an inactive surface which as such is difficult to bond, print, coat or dye. Illustrative of suitable synthetic organic polymers are as follows:

(1) Polypropylene;
(2) Copolymers or mixtures of two or more of polypropylene, polyethylene, ethylene-propylene rubber and the like polymer;
(3) Blends of polypropylene with a filler and/or an additive;
(4) Blends of a mixture or copolymer of polypropylene with a filler and/or an additive;
(5) Ethylene-propylene rubber;
(6) Copolymers or mixtures of ethylene-propylene rubber with another polymer or polymers;
(7) Blends of (5) or (6) with a filler and/or an additive;
(8) Polyethylene or copolymers or mixtures of polyethylene with another polymer or polymers;
(9) Blends of (8) with a filler and/or an additive;
(10) Polymethylpentene;
(11) Polyacetal or copolymers or mixtures of polyacetal with another polymer or polymers;
(12) Blends of (11) with a filler and/or an additive; and
(13) Other polymer bodies whose surfaces are difficult to be dyed, printed, coated or adhered.

Any shaped body of the above polymers may be used in the present invention. The shaped body may be, for example, a film, sheet, fiber, plate, rod, pipe or block.

In the method according to the present invention, a surface of the above polymer body is subjected to a spark discharge treatment. The spark discharge treatment may be carried out by passing the polymer body to be treated, by means of a belt conveyer or the like conveying device, through a tunnel with a length of 1–5 m within which a pair of opposing electrode plates are disposed. A high AC voltage of $2 \times 10^5$ to $10^6$ volts is impressed between the electrodes to effect spark discharge. An electric current flows through surfaces of the shaped polymer body which are oriented in the direction parallel with the direction of the spark discharges. Further, corona discharge is caused on surfaces of the shaped body. As a consequence, the surface of the shaped body is activated. An example of an electrical discharge treating apparatus suitably used for the purpose of the present invention is disclosed in U.S. Pat. No. 3,484,363, the disclosure of which is herein incorporated by reference.

In the method of the present invention, the above electric discharge treatment is preceded and/or followed by at least one treatment selected from a solvent treatment and a UV treatment. In this case, the order of these treatments are not specifically limited except for the solvent treatment being always followed by the spark discharge treatment or the UV treatment.

The solvent treatment is carried out by contacting a surface of the shaped body to be treated with a UV ray-absorbing organic liquid at a temperature and for a period of time sufficient to swell or etch the surface with the organic liquid. The UV ray-absorbing organic liquid may be an organic solvent capable of absorbing a UV ray with a wave length in the range of 1800–2100 Å. Examples of such organic solvents include aromatic hydrocarbons such as benzene, xylene and toluene, chlorinated aliphatic hydrocarbons such as carbon tetrachloride, tetrachloroethylene and trichloroethylene, acrylic esters such as methyl acrylate, and acrylic amides such as acrylamide. Solutions of photosensitizers in the above organic solvents may also be used as the UV ray-absorbing liquid. Examples of the photosensitizers include acetophenone or its derivatives such as benzyldimethylketal, benzophenone or its derivatives such as michler's ketone, benzoin or its derivatives such as benzoin ethylether, sulfides such as dibenzylsulfide, and onium salts such as diphenyliodonium salt.

Above all, the use of a chlorinated hydrocarbon, especially tetrachloroethylene is preferred not only because of its high swelling properties but also because of its capability to provide chlorine radical upon being irradiated with a UV ray or subjected to electric discharge. Such surface activation is considered to be attained according to the following mechanism. When a shaped body formed of a polyolefin and having a surface swollen with tetrachloroethylene is subjected to UV irradiation or electric discharge in an oxygen-containing atmosphere, the tetrachloroethylene can generate chlorine radicals which abstract the hydrogen atoms from the polyolefin to leave radicals on the polyolefin. Oxygen is then reacted with the radicals on the polyolefin to form oxygen-containing groups which are responsible for the increased surface energy of the resulting polyolefin shaped body.

The contact of the surface of the shaped body to be treated with the UV ray-absorbing liquid may be effected by immersion or any suitable coating method such as spray coating. The contact is performed at a temperature and for a period of time sufficient to swell the surface of the shaped body. More particularly, the contact is carried out preferably at a temperature in the range from 25° C. up to the boiling point of the UV absorbing liquid for a period of time from 1 second to 20 minutes, more preferably at a temperature in the range from 50 ° C. to a temperature lower by 5° C. than the boiling point for a period of time from 5 seconds to 5 minutes. By the contact at an elevated temperature, the organic liquid penetrates into amorphous portions constituting part of the surface of the shaped body, thereby to swell the surface. If desired, the contact may be carried out while applying an ultrasonic wave to the surface of the shaped body to improve swellability of the surface.

The swelling may be effected by contacting the surface of the shaped body to be treated with the UV ray-absorbing organic liquid heated to a suitable temperature. However, it is preferred that the swelling step be conducted by first heating the surface of the shaped body to be treated and then contacting the heated surface with the UV ray-absorbing organic liquid maintained at a temperature lower by 10-80° C. than that of the heated surface by any suitable cooling means. By this, vaporization of the organic liquid can be minimized without lowering the swelling efficiency.

That is, when the surface of the shaped body which has been heated to a high temperature, say over the boiling point of the UV ray-absorbing organic liquid, is contacted with the UV ray-absorbing organic liquid, the organic liquid in contact with the heated surface can be heated to a high temperature and can swell the surface with the simultaneous generation of vapors thereof. The vapors are, however, immediately condensed upon contact with the organic liquid which is present abundantly and maintained well below the boiling point thereof.

The heating of the surface may be effected by any known means such as an infrared lamp, an electric heater, a microwave generator, a high frequency generator or an oven.

The UV treatment is performed by irradiating UV rays on a surface of the shaped body to be treated.

As a source of the UV rays, there may be used a low pressure or a high pressure mercury lamp having an envelop made of a synthetic quartz glass and capable of emitting a UV ray with a wave length of 1800-2100 Å. It is preferred that the wave length of the UV ray to be irradiated on the swollen surface be concentrated to 1849 Å. It is also preferable to use a UV source generating UV rays with a high intensity. The UV irradiation may be performed at a temperature of 30-60° C. The atmosphere in which the irradiation is carried out is not specifically limited.

Suitable sequences of the above combined treatments are as follows:

(1) SOL→DIS (2) SOL→DIS→UV (3) SOL→DIS→SOL→UV (4) UV→DIS (5) UV→SOL→DIS (6) SOL→UV→DIS (7) SOL→UV→SOL→DIS (8) DIS→UV (9) DIS→SOL→UV wherein the abbreviations DIS, SOL and UV represent "electric discharge treatment", "solvent treatment" and "UV treatment", respectively.

Method (1) above is suited to treat a polymer shaped body, such as of a propylene homopolymer, which is difficult to be activated by spark discharges only. Methods (2) and (3) are effective when such a shaped body has concave surfaces. Methods (4)-(9) are effectively adopted when the shaped body to be treated is formed of a polymer which is able to be relatively easily activated by spark discharges but has a shape or structure which is unable to be activated by spark discharges.

The shaped body which has undergone the foregoing combined treatments is subjected, as such or after the removal of static electricity, to printing, coating, bonding or any other desired treatment.

The method for the treatment of a surface of a shaped body according to the present invention provides the following advantages:

1) The treated surface gives a smooth, beautiful and strong coated, printed or dyed layer;

2) The method does not require priming;

3) The method is simple, economical and does not require a long treatment time and, therefore, it is suited for industrial applications;

4) No dangerous gases such as chlorine gas are used;

5) The method does not cause deformation or melt of the surface to be treated;

6) The method is applicable to any shaped bodies such as films, fibers, rods, plates, cylinders and vessels; and 7) The method may be performed without generation of vapors of UV ray-absorbing organic liquid.

The following examples will further illustrate the present invention.

EXAMPLE 1

A shallow vessel having a shape as shown in FIG. 1 and formed of a low density polyethylene was washed with ethanol and dried. The cleaned vessel was then placed on a belt conveyer and passed through an electrical discharge treating apparatus (LECTROTREAT, 12 in. bulk type, manufactured by Pillar Corp.) for subjecting to a spark discharge treatment for about 3.5 minutes. The vessel was then subjected to UV irradiation using a low pressure mercury lamp having a synthetic quartz glass envelop (200 W, manufactured by SEN TOKU-SHUKOGEN CO., LTD.). The irradiation was carried out in air for 5 minutes with a distance between the lamp and the plate surface (the bottom surface "A" in FIG. 1) of 5 cm. An acrylic resin paint (Acryl lacquer, ULTRAMARINE) was sprayed over the thus treated surface about 2.5 hours after the completion of the UV irradiation to give a uniform beautiful coat.

The coat was dried in air at room temperature for about 100 hours and tested for its adhesive strength. The test was carried out by cutting the coated layer into small squares each having a 2 mm side, then pressingly applying an adhesive tape (MITSUBISHI UNICEL-LOPHANE TAPE 18), and peeling off the tape. The number of the cut squares remaining on the surface of the vessel was counted. The adhesion strength was calculated as a percentage of the number of the remaining squares on the basis of the original number of the squares before the stripping. The results are shown in Table 1.

COMPARATIVE EXAMPLE 1

The above procedure was repeated in the same manner as described except that the UV treatment was omitted. The results are summarized in Table 1.

TABLE 1

| | Adhesion Strength (%) | |
|---|---|---|
| Non-treated | Example 1 | Comparative Example 1 |
| 0 | 99 | 80 |

EXAMPLE 2

Figure 2:
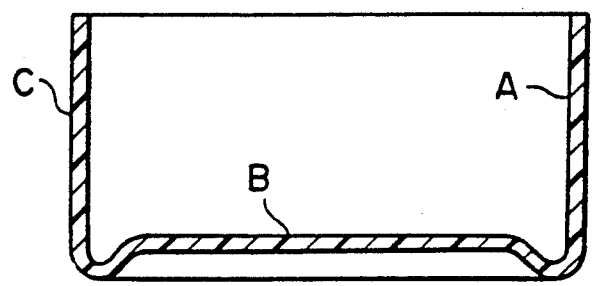

A cylindrical vessel having a shape as shown in FIG. 2 and formed of the same low density polyethylene as that of Example 1 was washed with ethanol and dried. The cleaned vessel was then subjected to a spark discharge treatment for about 3.5 minutes using the same electrical discharge apparatus as used in Example 1. The vessel was then subjected to UV irradiation using the same low pressure mercury lamp as used in Example 1 in air for 5 minutes with a distance between the lamp and the plate surface (the bottom surface "B" in FIG. 2) of 5 cm. An acrylic resin paint as used in Example 1 was sprayed over the thus treated surface about 0.5 hour after the completion of the UV irradiation to give a uniform beautiful coat. The coat was dried in air at room temperature for about 96 hours and tested for its adhesive strength in the same manner as that in Example 1. The test was carried out for the surfaces A, B and C indicated in FIG. 2. The test results are shown in Table 2.

COMPARATIVE EXAMPLE 2

The procedure of Example 2 was repeated in the same manner as described except that the UV treatment was omitted. The results are summarized in Table 2.

EXAMPLE 3

Example 2 was repeated in the same manner as described except that the electric discharge treatment was preceded by the UV treatment. The results are summarized in Table 2.

TABLE 2

| Surface | Adhesion Strength (%) | | |
|---|---|---|---|
| | Example 2 | Example 3 | Comparative Example 2 |
| A | 100 | 100 | 10 |
| B | 100 | 100 | 30 |
| C | 96 | 90 | 85 |

EXAMPLE 4

Figure 3:
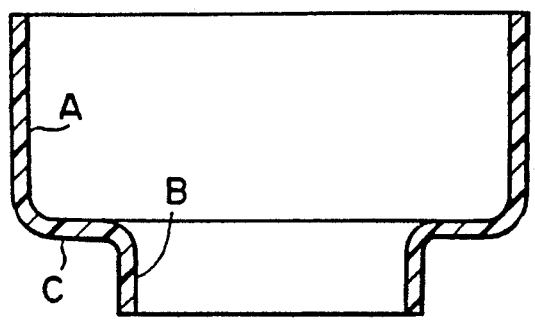

A cylindrical body having large and small diameter portions as shown in FIG. 3 and formed of the same low density polyethylene as that of Example 1 was subjected to electric discharge and UV treatments in the same manner as that in Example 1. The resulting coat was then tested (surface portions A, B and C as shown in FIG. 3) in the same manner as that in Example 1, giving the results shown in Table 3.

COMPARATIVE EXAMPLE 3

The procedure of Example 4 was repeated in the same manner as described except that the UV treatment was omitted. The results are summarized in Table 3.

TABLE 3

| Surface | Adhesion Strength (%) | |
|---|---|---|
| | Example 4 | Comparative Example 3 |
| A | 100 | 100 |
| B | 100 | 100 |
| C | 95 | 70 |

From the results shown in Tables 1-3 it will be seen that the spark discharge treatment is effective only to an inside surface of an open-ended tubular body (Comparative Example 3). An inside bottom of a shallow vessel (Comparative Example 1) and outer surfaces of cylindrical bodies (Comparative Examples 2 and 3) are not able to be activated satisfactorily by the spark discharge treatment. Especially, outer surface and inside bottom surface of a deep vessel (Comparative Example 2) are hardly activated by the spark discharge treatment. On the other hand, when the spark discharge treatment is preceded or followed by the UV treatment, any surface of a shaped body can be effectively activated.

EXAMPLE 5

A commercially available polypropylene resin plate having a thickness of 2 mm and containing a small amount of an oxidation-preventing agent was washed with ethanol, dried, then heated to about 95° C. with an infrared maintained at that temperature for a period of time as shown in Table 4. The heated plate was immersed, for a period of time as shown in Table 4, in a tetrachloroethylene bath maintained at about 20° C. The plate was taken out of the bath, allowed to stand at room temperature for 2 minutes and then subjected to a spark discharge treatment for a period of time as shown in Table 4 in the same manner as that of Example 1. After the treatment, an acrylic paint was applied to the treated surface and the coat was subjected to an adhesion test in the same manner as that of Example 1. The results are summarized in Table 4.

TABLE 4

| Sample No. | Preheat time (second) | Immersion time (second) | Discharge treatment time (minute) | Adhesion strength (%) |
|---|---|---|---|---|
| 1 | 30 | 30 | 3.5 | 99 |
| 2 | 30 | 60 | 3.5 | 99 |
| 3 | 60 | 30 | 3.5 | 100 |
| 4 | 60 | 60 | 3.5 | 72 |
| 5 | 30 | 30 | 7* | 96 |
| 6 | 60 | 30 | 7* | 90 |

*twice treated

COMPARATIVE EXAMPLE 4

The procedure for Sample No. 1 of Example 5 was repeated in the same manner as described except that the treatment with tetrachloroethylene was omitted. The adhesion test showed an adhesion strength of 0%. The adhesion strength was not improved even when the spark discharge treatment was repeated thrice (3.5 minutes per one treatment).

The results of Example 5 and Comparative Example 4 suggest that a shaped body of polypropylene cannot be surface-activated by an electric discharge treatment but can be effectively activated when the discharge treatment is preceded by a treatment with tetrachloroethylene.

EXAMPLE 6

A commercially available polypropylene resin plate having a thickness of 2 mm and containing a small amount of an oxidation-preventing agent was washed with ethanol, dried, heated to about 90° C. with an infrared heater for 1 minute and then immersed for 1 minute in a tetrachloroethylene:carbon tetrachloride (50:50) mixed solvent bath maintained at about 20° C. The plate was taken out of the bath, allowed to stand at room temperature for 1 minute and then subjected to an electric discharge treatment for 3.5 minutes using the same spark discharge treating apparatus as used in Example 1. The thus treated plate was further immersed in tetrachloroethylene at 60° C. for 1 minute, allowed to stand at room temperature for 1 minute and then subjected to UV irradiation using a 200 W low pressure mercury lamp having a synthetic quartz glass envelop. The irradiation was carried out in air for 1 minute with a distance between the lamp and the plate surface of 5 cm. An acrylic resin paint was coated over the treated surface and the coat was tested in the same manner as that of Example 1. The adhesion strength was found to be 100%.

We claim:

1. A method of activating a surface of a shaped body formed of a synthetic organic polymer comprising:
   (a) contacting said surface with a spark discharge to increase the surface energy of said surface; and
   (b) at least one treatment selected from:
      (1) contacting said surface with a UV ray-absorbing organic liquid at a temperature and for a period of time sufficient to swell said surface; and
      (2) irradiating said surface with UV rays having wave lengths in the range of 1800–2100 Å.

2. A method as set forth in claim 1, wherein step (b) includes heating said surface to a temperature of 30° C. or more, and then contacting said heated surface with the UV ray-absorbing organic liquid maintained at a temperature lower by 10–80° C. than that of said heated surface.

3. A method as set forth in claim 2, wherein said contacting said heated surface with the UV ray-absorbing organic liquid is performed for a period of 1 second to 20 minutes.

4. A method as set forth in claim 3, wherein said surface is heated to 50° C. or more.

5. A method as set forth in claim 6, wherein said surface is contacted with the UV ray-absorbing organic liquid heated at a temperature not lower than 25° C. but lower than the boiling point of the UV-ray-absorbing organic liquid.

6. A method as set forth in claim 1, comprising step (b) (1) followed by step (a) or step (b).

7. A method as set forth in claim 6, wherein step (b) (1) is followed by step (a).

8. A method as set forth in claim 7, further comprising repeating step (b)(1) after step (a) and wherein step (b)(2) follows said repeated step (b)(1).

9. A method as set forth in claim 6, comprising steps (a), (b)(1) and (b)(2) and wherein step (b)(1) is followed by step (b)(2).

10. A method as set forth in claim 9, wherein step (b)(1) is followed by step (a) and by step (b)(2).

11. A method as set forth in claim 9, further comprising repeating step (b)(1) after step (b)(2) and wherein step (a) follows said repeated step (b)(1).

* * * * *

UNITED STATES PATENT AND TRADEMARK OFFICE
CERTIFICATE OF CORRECTION

PATENT NO. : 5,059,447
DATED : October 22, 1991
INVENTOR(S) : KATOH et al

It is certified that error appears in the above-identified patent and that said Letters Patent is hereby corrected as shown below:

Col. 8, line 10, after "infrared" insert --heater and--.

IN THE CLAIMS:

Col. 10, line 5, delete "6" and insert --1--.

Signed and Sealed this

Eighteenth Day of May, 1993

Attest:

MICHAEL K. KIRK

Attesting Officer

Acting Commissioner of Patents and Trademarks